United States Patent
Tawara et al.

(10) Patent No.: US 7,004,671 B2
(45) Date of Patent: Feb. 28, 2006

(54) PIPE CONNECTING STRUCTURE AND CLEANING TOOL

(75) Inventors: Hirotoshi Tawara, Tokyo (JP); Makoto Kato, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/176,052

(22) Filed: Jun. 21, 2002

(65) Prior Publication Data

US 2003/0001387 A1    Jan. 2, 2003

Related U.S. Application Data

(63) Continuation of application No. PCT/JP00/08749, filed on Dec. 11, 2000.

(30) Foreign Application Priority Data

| Dec. 21, 1999 | (JP) | ................................. 11-363412 |
| May 1, 2000 | (JP) | ............................. 2000-132396 |
| Nov. 10, 2000 | (JP) | ............................. 2000-344065 |

(51) Int. Cl.
  *F16B 7/00*   (2006.01)

(52) U.S. Cl. ................... 403/341; 403/293; 403/379.4; 403/379.5; 16/422; 15/143.1; 15/145; 285/7

(58) Field of Classification Search ............... 403/279, 403/281, 293, 315, 316, 319, 341, 376–378, 403/109.1–109.6, 109.8, 379.4, 379.5, 379.6; 16/422, 427, 429, 405, 406; 15/143.1, 144.1–144.4, 15/145, 231; 285/302, 303, 7, 321, 305
See application file for complete search history.

(56) References Cited

U.S. PATENT DOCUMENTS

| 3,049,367 | A | * | 8/1962 | Lashta ............................ 285/7 |
| 3,244,437 | A | * | 4/1966 | Belicka et al. .......... 285/303 X |
| 3,306,639 | A | * | 2/1967 | Lyon .......................... 403/107 |
| 3,498,650 | A | * | 3/1970 | Strange .................. 403/377 X |
| 4,830,035 | A |  | 5/1989 | Liu |
| 5,579,558 | A | * | 12/1996 | Newman et al. .............. 16/429 |
| 5,729,865 | A | * | 3/1998 | Stoddart ...................... 16/429 |
| 6,213,672 | B1 | * | 4/2001 | Varga .................... 15/144.4 X |
| 6,254,305 | B1 | * | 7/2001 | Taylor ........................ 403/378 |
| 6,305,869 | B1 | * | 10/2001 | Chen ....................... 403/109.5 |
| 6,546,596 | B1 | * | 4/2003 | Grote et al. .................. 16/429 |

FOREIGN PATENT DOCUMENTS

DE          2839635         4/1979

(Continued)

*Primary Examiner*—Daniel P. Stodola
*Assistant Examiner*—Michael P. Ferguson
(74) *Attorney, Agent, or Firm*—Oblon, Spivak, McClelland, Maier & Neustadt, P.C.

(57) ABSTRACT

A pipe connecting structure for connecting a pair of sleeve-like pipes integrally in an axial direction by inserting a male side end portion of one of the pair of sleeve-like pipes into an opening of a female side end portion of the other sleeve-like pipe so as to serve as a connecting portion, wherein a male side protrusion insertion hole and a female side protrusion insertion hole are formed in a peripheral surface of each end portion of a pair of the sleeve-like pipes which constitute the connecting portion, the protrusion insertion holes are brought into coincident with each other, an engagement protrusion is inserted in the protrusion insertion holes and engaged therewith, and such an engagement state of the engagement protrusion is retained by pressing the engagement protrusion with a sleeve member disposed in such a manner as to cover the connecting portion.

18 Claims, 8 Drawing Sheets

FOREIGN PATENT DOCUMENTS

| | | | |
|---|---|---|---|
| EP | 0 841 033 | * | 9/1997 |
| EP | 841033 | | 5/1998 |
| GB | 1 533 631 | | 11/1978 |
| JP | 57-77447 | | 5/1982 |

* cited by examiner
PIPE CONNECTING STRUCTURE AND CLEANING TOOL

TECHNICAL FIELD

The present invention relates to a pipe connecting structure for connecting a pair of sleeve-like pipes integrally in an axial direction, and a cleaning tool in which this pipe connecting structure is used.

BACKGROUND ART

For example, in an elongated rod-like member 51 such as a handle of a cleaning tool 50 shown in FIG. 12, a handle of a stick and the like is occasionally formed by connecting a plurality of circular sleeve-like pipes 52 having a predetermined length integrally in an axial direction. As a structure of a connecting portion 53 for integrally connecting the circular sleeve-like pipes 52, for example, there is known a structure in which a female screw element having a female screw on an internal peripheral surface thereof is attached to an opening in each end portion of, a pair of circular sleeve-like pipes 52, 52 to be connected together and the pair of female screw elements are placed in opposing relation to each other and a male screw element having a male screw on an outer peripheral surface thereof is threadingly engaged with the two female screw elements so that the pair of circular sleeve-like pipes 52, 52 are integrally joined.

According to a structure of the above-mentioned conventional connecting portion 53, in addition to the threading engagement between the female screw elements and the male screw element, the male screw is prevented from getting loosened by frictional force between end faces of the male and female screw elements abutted with each other in opposing relation. Accordingly, when a bending stress is applied to the connecting portion 53, a gap is generated between the abutting end faces. As a result, a frictional force is no longer obtained and the threading engagement relation between the female screw elements and the male screw elements tends to be loosened. Moreover, the connecting portion 53 is bent and readily broken. Besides, according to a structure of the conventional connecting portion 53, the structure is complicated.

Moreover, according to a structure of the conventional connecting portion 53, since the pair of circular sleeve-like pipes 52, 52 are connected by threadingly engaging the male screw element with the female screw elements, the work for integrally connecting the pipes necessitates time and labor. Particularly, a connecting operation in a dark place becomes difficult.

It is an object of the present invention to provide a pipe connecting structure and a cleaning tool using the pipe connecting structure, in which a connecting portion can effectively be prevented from being loosened and broken even in the case where a bending stress is applied thereto and in which a pair of sleeve-like pipes can easily be connected integrally in an axial direction with a simple structure.

Another object of the present invention is to provided a pipe connecting structure and a cleaning tool using the pipe connecting structure, in which a pair of sleeve-like pipes can easily be connected integrally in an axial direction by means of a simple operation and in which a connecting operation can be performed smoothly even in a dark place.

A further object of the present invention is to provide a pipe connecting structure and a cleaning tool using the pipe connecting structure, in which an integrally connected pair of sleeve-like pipes can smoothly be disassembled.

SUMMARY OF INVENTION

The present invention has achieved the above objects by providing a pipe connecting structure for connecting a pair of sleeve-like pipes integrally in an axial direction by inserting a male side end portion of one of the pair of sleeve-like pipes into an opening of a female side end portion of the other sleeve-like pipe so as to serve as a connecting portion, wherein a male side protrusion insertion hole and a female side protrusion insertion hole are formed in a peripheral surface of each end portion of a pair of the sleeve-like pipes which constitute the connecting portion, the protrusion insertion holes are brought into coincident relation with each other, an engagement protrusion is inserted in the protrusion insertion holes and engaged therewith, and such an engagement state of the engagement protrusion is retained by engagement retainer means.

The present invention also has achieved the above objects by providing a cleaning tool including a handle constituted by connecting a plurality of sleeve-like pipes integrally in an axial direction through the above-mentioned pipe connecting structure.

PREFERRED EMBODIMENTS FOR CARRYING OUT THE INVENTION

Figure 11:
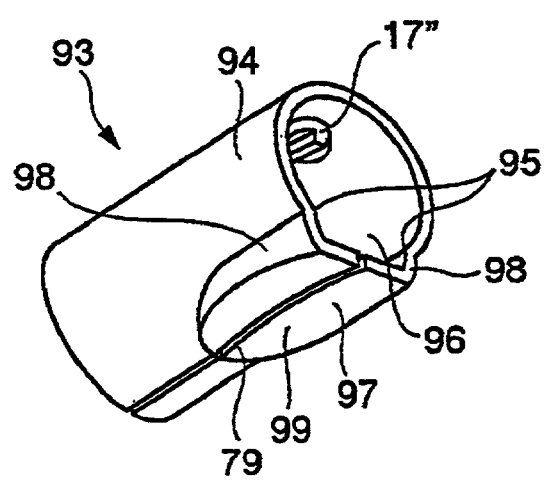
FIG. 11 is a perspective view showing a further mode of a sleeve member used in a pipe connecting structure of the present invention.
Figure 12:
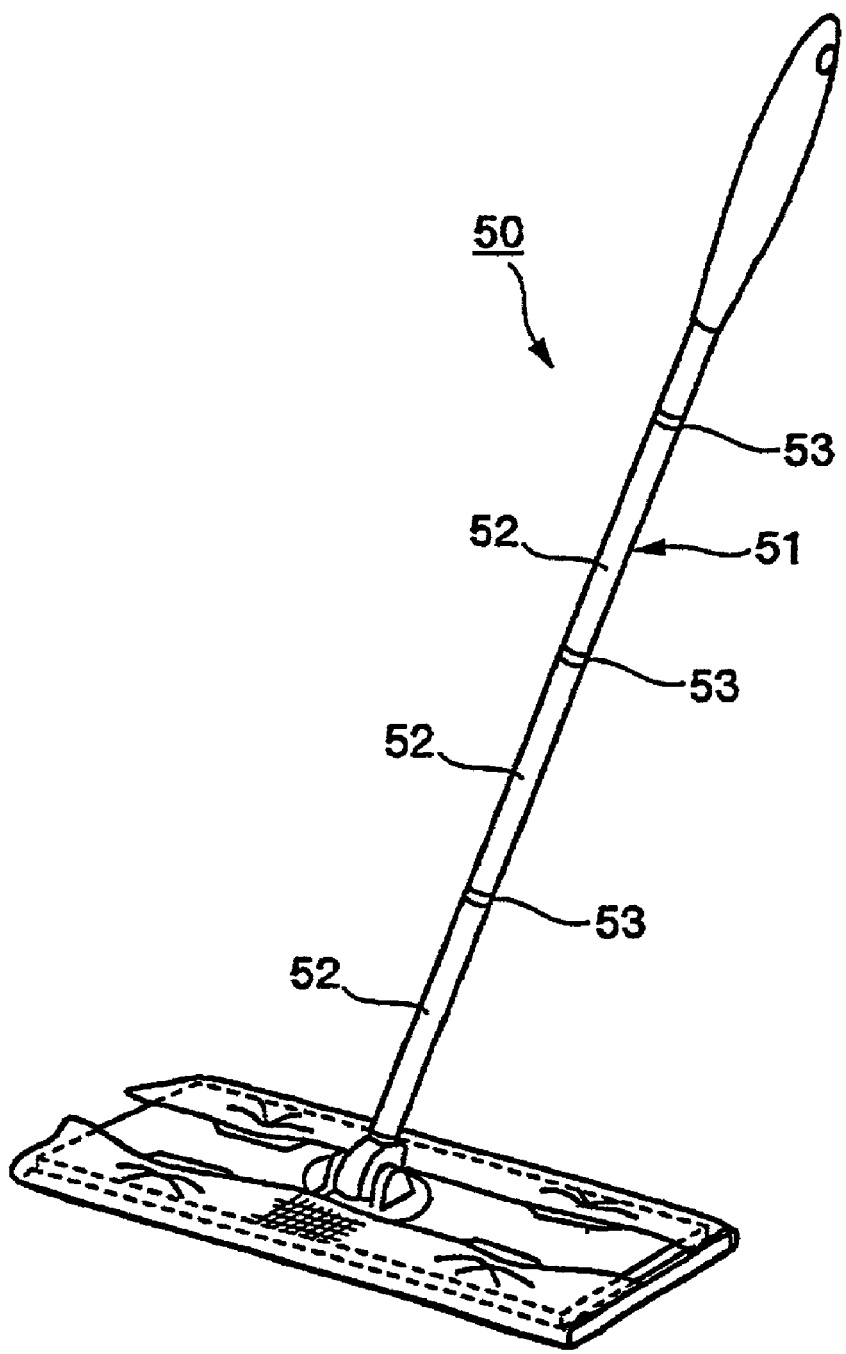
FIG. 12 is a perspective view showing a cleaning tool equipped with a conventional pipe connecting structure.

A pipe connecting structure according to a preferred embodiment of the present invention is employed at the time for connecting, integrally in an axial direction, a plurality of circular sleeve-like pipes constituting a handle of a cleaning tool which comprises a cleaning plate attached with a cleaning sheet member for wiping a floor surface, etc., for example, and the handle extending from the cleaning plate (see FIG. 11). For the sake of convenience of transportation and sales, the cleaning tool is designed such that it can be disassembled into component parts such as a cleaning plate, a circular sleeve-like pipe and the like. And those component parts are produced as a group. At the time of use, those component parts are assembled. At the time of storage or disposal, the cleaning tool is disassembled into those component parts.

Figure 1:
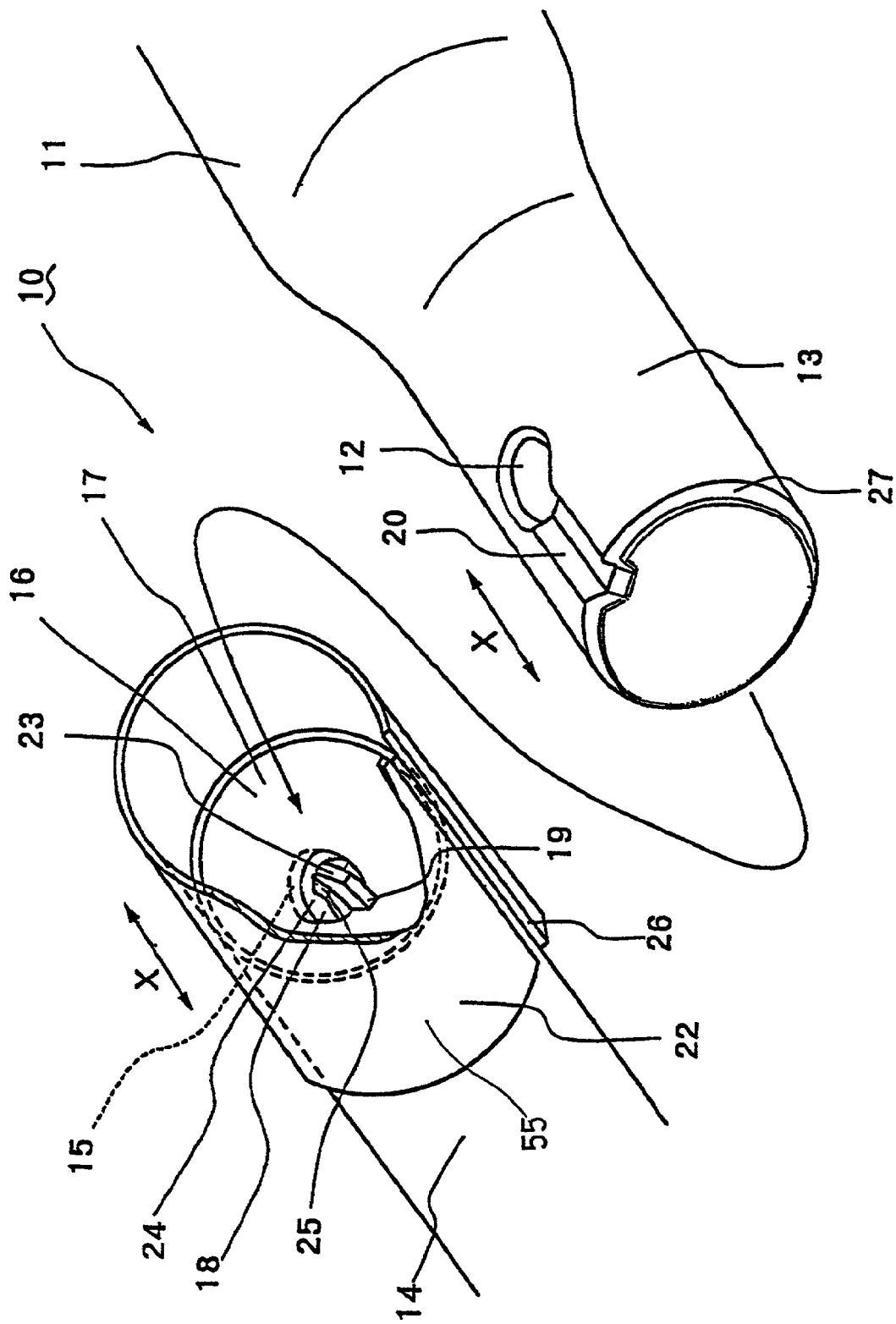
FIG. 1 is an exploded perspective view for explaining a pipe connecting structure according to one embodiment of the present invention.
Figure 2:
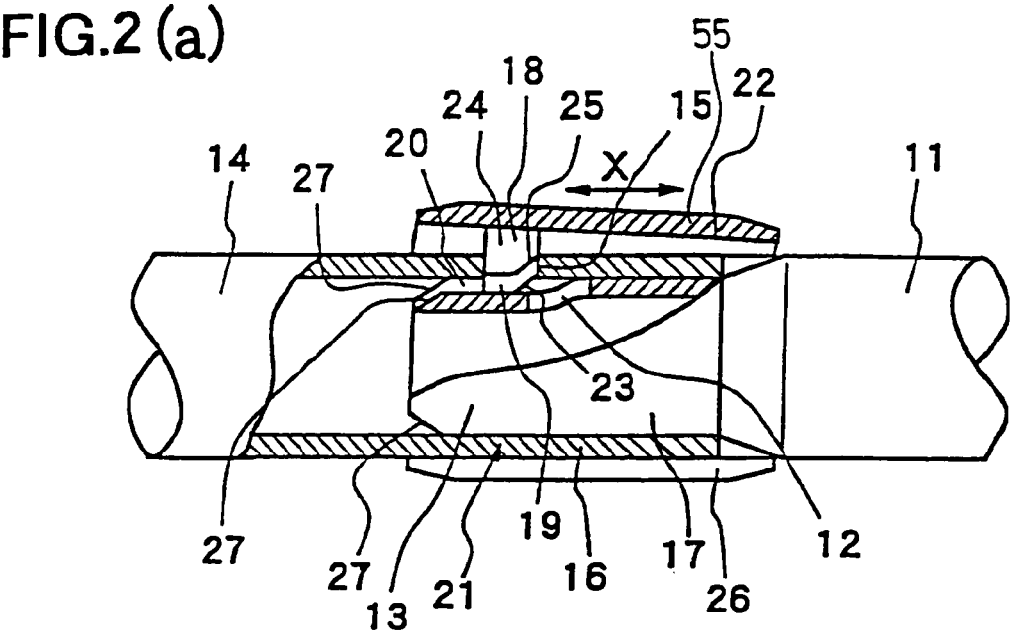
FIGS. 2(*a*) and 2(*b*) are sectional views, partly cutaway, for explaining a pipe connecting structure according to one embodiment of the present invention.
Figure 2:
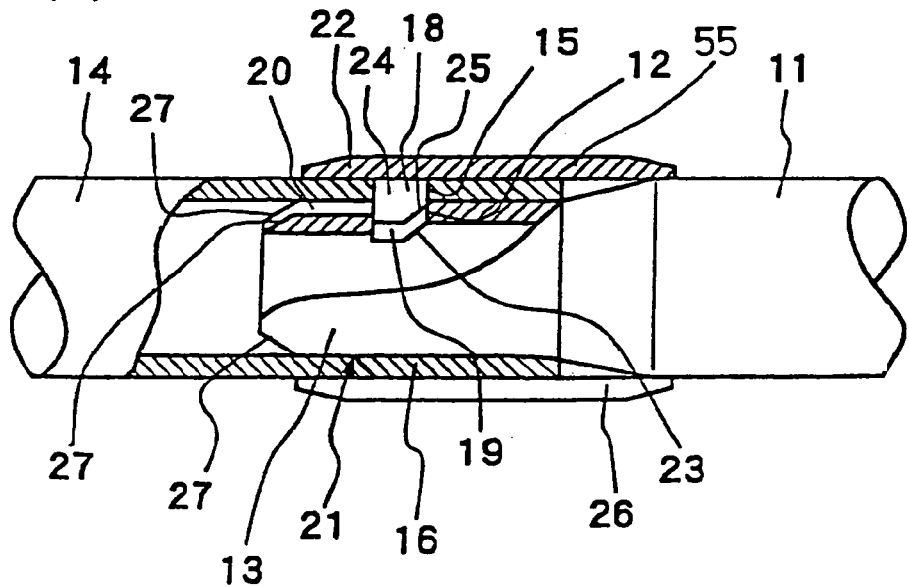
Figure 3:
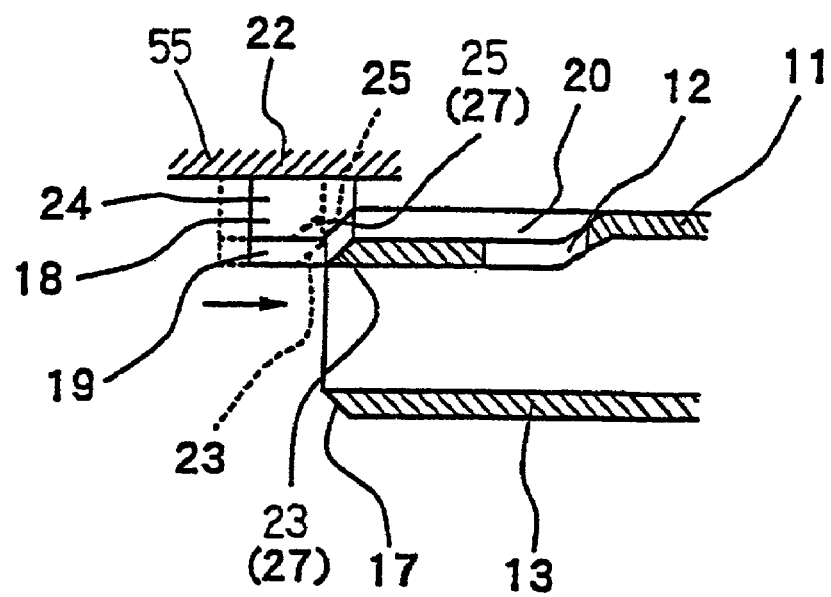
FIG. 3 is a sectional view of an essential portion for explaining a positioning state in a pipe connecting structure according to one embodiment of the present invention.

A pipe connecting structure 10 according to this embodiment is employed at connecting sections of the pair of circular sleeve-like pipes which constitute a handle composed of a plurality of circular sleeve-like pipes. As shown in FIGS. 1 to 3, a male side end portion 13 having a circular male side protrusion insertion hole (male side protrusion engagement hole) 12 of one circular sleeve-like pipe 11 is inserted into a distal end opening 17 of a female side end portion 16 having a circular female side insertion hole (female side protrusion engagement hole) 15 of the other circular sleeve-like pipe 14 so as to serve as a connecting portion 21, the protrusion insertion holes 12, 15 are brought into coincident alignment with each other, the engagement protrusion 18 which has been biased radially inwardly is inserted in the protrusion insertion holes 12, 15 from outside and engaged therewith, and such an engagement state of the engagement protrusion 18 is retained by pressing the engagement protrusion with a sleeve member 22 as an engagement retainer means. By doing so, the pair of circular sleeve-like pipes 11, 14 are connected integrally in an axial direction X.

The protrusion insertion holes 12, 15 are formed, respectively, in the end portions 13, 16 of the circular sleeve-like pipes 11, 14 which constitute the connecting portion 21. A cutout 26 is formed on the sleeve member 22. Owing to the cutout 26, the sleeve member 22 serves as a resilient portion which is deformed radially outwardly as a whole to thereby generate a biasing force in a radially inwardly. The protrusion insertion holes 12, 15 of the end portions 13, 16 are brought into coincident alignment with each other and the engagement protrusion 18, which is integrally formed on an inner peripheral surface of the sleeve member 22, is inserted into the coincided protrusion insertion holes 12, 15 from the outside of the connecting portion 21 and engaged therewith. The engagement protrusion 18 is then pressed with the sleeve member 22 so that the engagement state of the engagement protrusion 18 is firmly retained.

The engagement protrusion 18 is projectingly formed with a guide rib 19 extending in the axial direction X of the circular sleeve-like pipes 11, 14. The circular sleeve-like pipe 11 has a guide groove 20 formed in an outer peripheral surface thereof and extending in the axial direction X of the circular sleeve-like pipe 11 from its distal end edge portion to the male side protrusion insertion hole 12. At the time of inserting the male side end portion 13 of the circular sleeve-like pipe 11 into the distal end opening 17 of the other circular sleeve-like pipe 14, the engagement protrusion 18 is inserted into the female side protrusion insertion hole 15 of the circular sleeve-like pipe 14 from outside and allowed to be projected inside. In that state, the guide rib 19 is brought into engagement with the guide groove 20 of the circular sleeve-like pipe 11 and then slidingly moved towards the male side protrusion insertion hole 12 along the guide groove 20. By doing so, the engagement protrusion 18 is guided into the coincided protrusion insertion holes 12, 15 from the female side end portion 16 and lockingly engaged therewith (see FIGS. 2(a) and 2(b)). The male side protrusion insertion hole 12 and the female side protrusion insertion hole 15 have an inside diameter generally equal to the outside diameter of the engagement protrusion 18.

Both the circular sleeve-like pipes 11, 14 are hollow-interior pipe members which are made of metal (aluminum) and which have a circular cross section. The male side end portion 13 of the circular sleeve-like pipe 11 is reduced in diameter. This male side end portion 13 having a reduced diameter is inserted into the distal end opening 17 of the female side end portion 16 of the other circular sleeve-like pipe 14, thereby forming the connecting portion 21 having a dual structure in which the male side end portion 13 of the circular sleeve-like pipe 11 is tightly overlapped with the female side end portion 16 of the other circular sleeve-like pipe 14. Owing to this arrangement, the handle is more enhanced in connecting strength compared with the conventional connecting structure using a screw and in addition, play can be prevented from occurring at the time of cleaning operation. It is also accepted that the circular sleeve-like pipe 11 has such a circular cross section in which its outside diameter is generally equal to the inside diameter of the female side end portion. By using such a pipe as just mentioned, the male side end portion can be inserted into the opening of the female side end portion 16 without reducing its diameter.

According to this embodiment, the male side end portion 13 of the circular sleeve-like pipe 11 has an outer peripheral surface which is initially reduced in diameter with a steep gradient and then gradually reduced in diameter towards the distal end with a gentle gradient. The female side end portion 16 of the other circular sleeve-like pipe 14 is enlarged in diameter towards the distal end with a gentle gradient coincident with the gradient of the above-mentioned end portion which is reduced in diameter. Accordingly, the reduced-diameter portion of the circular sleeve-like pipe 11 is inserted into the distal end opening 17 of the other circular sleeve-like pipe 14 until its base end of steep gradient portion is brought into abutment with the opening edge portion. By doing so, the end portions 13, 16 can be tightly contacted with each other with ease.

The protrusion insertion holes 12, 15 are formed in such locations that the male side protrusion insertion hole 12 of the circular sleeve-like pipe 11 can easily be brought into coincident alignment with the protrusion insertion hole 15 of the other circular sleeve-like pipe 14 by fully inserting the reduced-diameter portion of the circular sleeve-like pipe 11 up to its base end portion into the distal end opening 17 of the other circular sleeve-like pipe 14.

The sleeve member 22 arranged in such a manner as to cover the connecting portion 21 is made of, for example synthetic resin (plastics). The sleeve member 22 includes a sleeve body 55 composed of a circular sleeve-like member having an inside diameter large enough to cover the periphery of the connecting portion 21 in a tightly contacted manner, and the circular engagement protrusion 18 integrally formed on and projecting from an inner surface of the sleeve body 55. The cutout 26 is formed in the sleeve member 22 over the entire length of the sleeve body 55 in an axial direction. The sleeve body 55 is resiliently deformed outwardly in a radial direction as the width of the cutout 26 is spread in the circumferential direction. As a result, the sleeve body 55 is enlarged in diameter. Thus, the overall sleeve body 55 constitutes a resilient portion which is deformed outwardly in the radial direction to thereby generate a biasing force inwardly in the radial direction. Accordingly, at the time of attaching the sleeve member 22 in such a manner as to cover the connecting portion 21, the engagement protrusion 18 integrally formed on the sleeve member 22 can be biased inwardly in the radial direction by the resilient force.

The engagement protrusion 18 includes a base portion 24 in the form of a drum-like projections having a circular configuration in section. The engagement protrusion 18 is integral with the sleeve member 22 which is made of synthetic resin and which is attached in such a manner as to cover the connecting portion 21. The engagement protrusion 18 protrudes inwardly in a radial direction from an inner surface of the sleeve member 22. The engagement protrusion 18 has the guide rib 19 formed on the inner end portion thereof in such a manner as to traverse the center of the base portion 24 and projecting further inward. The guide rib 19 has a width just enough to be matingly engaged with and slidingly moved along the guide groove 20. The guide rib 19 has a tapered surface 23 on the side towards the distal end of the circular sleeve-like pipe 14. The tapered surface 23 is tapered downward towards the distal end. By virtue of a provision of this tapered surface 23, the connecting resistance between the guide rib 19 and the guide groove 20 can be reduced at the time of connection. Therefore, a smooth connecting operation can be obtained. The base portion 24 also has a tapered surface 25 which is likewise tapered downward towards the distal end.

The guide groove 20 of the circular sleeve-like pipe 11 is formed by linearly depressing the outer peripheral surface of the circular sleeve-like pipe 11 on the male side end portion 13 having a reduced diameter, such that the guide groove 20 linearly extends in the axial direction X of the circular sleeve-like pipe 11 from the distal end edge portion of the pipe 11 to the male side protrusion insertion hole 12. The guide groove 20 has a shallow rectangular or trapezoidal configuration in section. The width of a bottom surface of the guide groove 20 is slightly larger than that of the guide rib 19. By this, the guide rib 19 can smoothly be guided to the male side protrusion insertion hole 12 in a stable manner and without allowing it to escape from the guide groove 20.

The circular sleeve-like pipe 11 has an annular tapered surface 27 which is formed along its distal end peripheral edge. The annular tapered surface 27 including a distal end edge portion of the guide groove 20 is tapered inward towards the distal end side. At the time of connecting operation, as later described, of the pair of circular sleeve-like pipes 11, 14, the tapered surface 23 of the guide rib 19 is brought into abutment with the annular tapered surface 27 and the pair of circular sleeve-like pipes 11, 14 are rotated relative to each other. By doing so, the guide rib 19 can be guided into the guide groove 20 smoothly.

In order to connect the pair of circular sleeve-like pipes 11, 14 integrally in the axial direction X, first, the sleeve member 22 is attached to the circular sleeve-like pipe 14 in such a manner as to cover the outer peripheral surface of the distal end portion of the pipe 14, and the engagement protrusion 18 is inserted into the female side protrusion insertion hole 15 of the circular sleeve-like pipe 14 such that an inner portion of the engagement protrusion 18 including the guide rib 19 projects from the inner surface of the circular sleeve-like pipe 14. The inside diameter of the sleeve member 22 is slightly smaller than the outside diameter of the circular sleeve-like pipe 14. Accordingly, the sleeve member 22 is attached to the outer peripheral surface of the circular sleeve-like pipe 14 while spreading the width of the cutout 26 in the circumferential direction and resiliently deforming the sleeve member 22 in such a manner as to enlarge its diameter. By doing so, the engagement protrusion 18 is biased inwardly in the radial direction and projected from the inner surface of the circular sleeve-like pipe 14 with the tapered surfaces 23, 25 directed to the distal end side of the pipe 14 (see FIG. 1).

Then, the male side end portion 13 having a reduced diameter of the circular sleeve-like pipe 11 is inserted into the distal end opening 17 of the female side end portion 16 of the circular sleeve-like pipe 14. By doing so, the distal end peripheral edge portion of the circular sleeve-like pipe 11 is brought into abutment with the distal end face of the guide rib 19 (see the portion indicated by a broken line of FIG. 3) projecting inwardly from the circular sleeve-like pipe 14 at the annular tapered surface 27 where the guide groove 20 is not formed, for example. With the abutment force in a direction of insertion along the axial direction X retained, when the circular sleeve-like pipe 11 is then rotated relative to the circular sleeve-like pipe 14, the guide rib 19 is brought to that area of the annular tapered surface 27 where the guide groove 20 is formed and the tapered surface 23 of the guide rib 19 is engaged with and abutted with the annular tapered surface 27 at that area where the stepped part of the guide groove 20 is located (see the portion indicated by a solid line of FIG. 3). By this, the location of the guide groove 20 can easily and clearly be manually recognized and the guide rib 19 can precisely and assuredly move along the guide groove 20.

Thereafter, when the male side end portion 13 having a reduced diameter of the circular sleeve-like pipe 11 is inserted further into the distal end opening 17 of the circular sleeve-like pipe 14, the guide rib 19 of the engagement protrusion 18 rides over the guide groove 20 while resiliently deforming the sleeve member 22 and smoothly moves towards the male side protrusion insertion hole 12 along the guide groove 20 (see FIG. 2(*a*)). When the engagement protrusion 18 reaches the male side protrusion insertion hole 12, it is pushed down by resilient force directing inwardly in the radial direction of the sleeve member 22 and is inserted into the male side protrusion insertion hole 12 from the female side end portion 16 side so that it is lockingly engaged with the coincided protrusion insertion holes 12, 15 easily and smoothly (see FIG. 2(*b*)). By this, the pair of circular sleeve-like pipes 11, 14 can have a rigid connecting portion 21 of a dual structure in which the male side end portion 13 and the female side end portion 15 are overlapped with each other in a tightly contacted state. Since the engagement protrusion 18 is covered up and pressed with the sleeve body 55, the engagement state of the engagement protrusion 18 is easily and assuredly retained without allowing the engagement protrusion 18 to escape from the protrusion insertion holes 12, 15.

That is to say, according to this embodiment, the pair of circular sleeve-like pipes 11, 14 can easily integrally be connected together in the axial direction through a simple structure and operation. Moreover, the guide rib 19 can be brought into engagement with the guide groove 20 by manual feel and therefore, the pair of circular sleeve-like pipes 11, 14 can easily be connected by correctly positioning them even in a dark place.

According to this embodiment, since the connecting portion 21 has a dual structure in which the male side end portion 13 of the circular sleeve-like pipe 11 and the female side end portion 16 of the other circular sleeve-like pipe 14 are tightly contacted with each other over a certain length (25 mm in this embodiment), the connecting portion 21 can effectively be prevented from being loosened and broken because, even if a large bending stress is applied to the connecting portion 21 during the use of the cleaning tool or the like, such a large bending stress is fully absorbed by a lapping portion of the dual structure. Particularly, since the circular sleeve-like pipes 11, 14 are composed of a metal pipe member, a more firm supporting force can be applied against the bending force. Hence, according to this embodiment, the connecting portion 21 can effectively be prevented from being loosened and broken even if a large bending stress is applied to the connecting portion 21.

Figure 4:
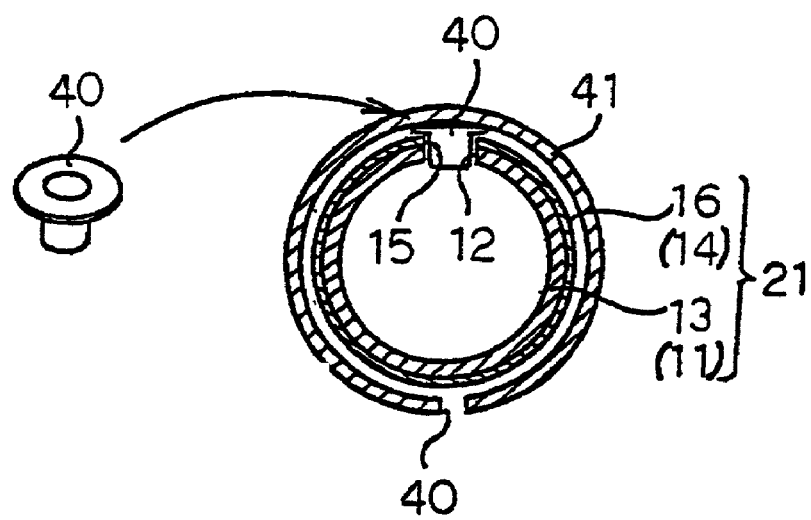
FIG. 4 is a cross sectional view for explaining another mode of the pipe connecting structure.
Figure 5:
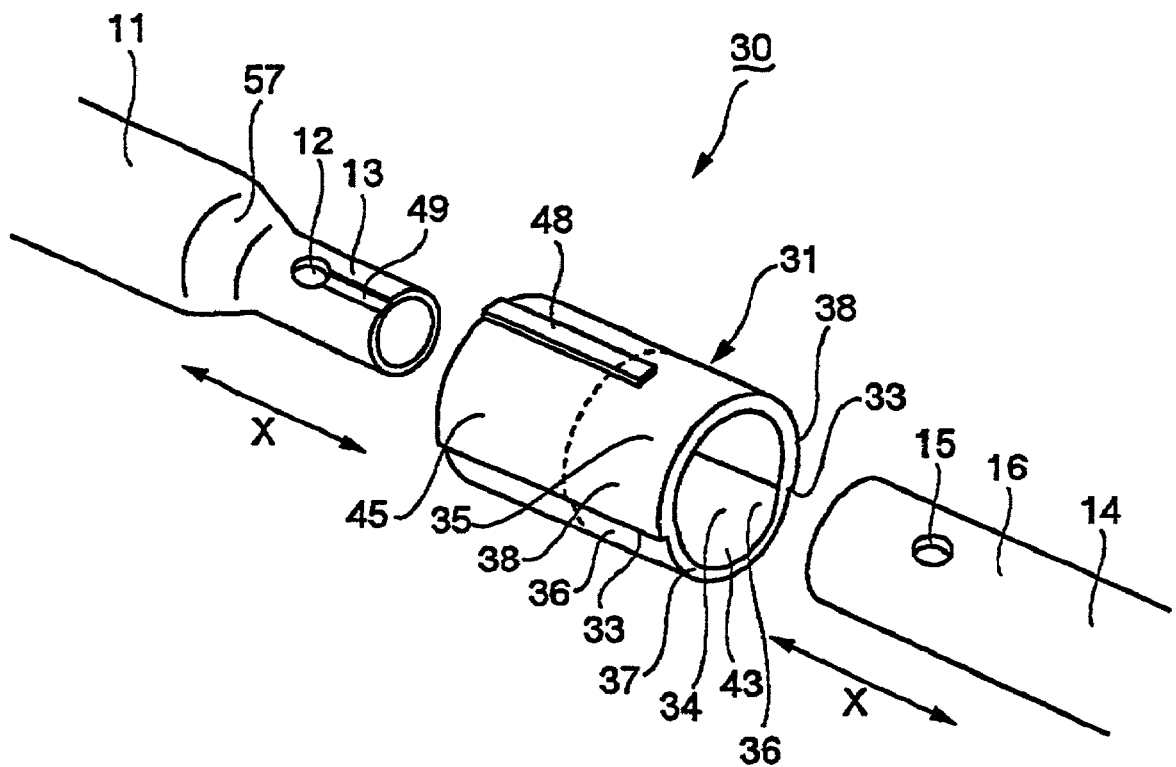
FIG. 5 is an exploded perspective view for explaining a pipe connecting structure according to another embodiment of the present invention.
Figure 6:
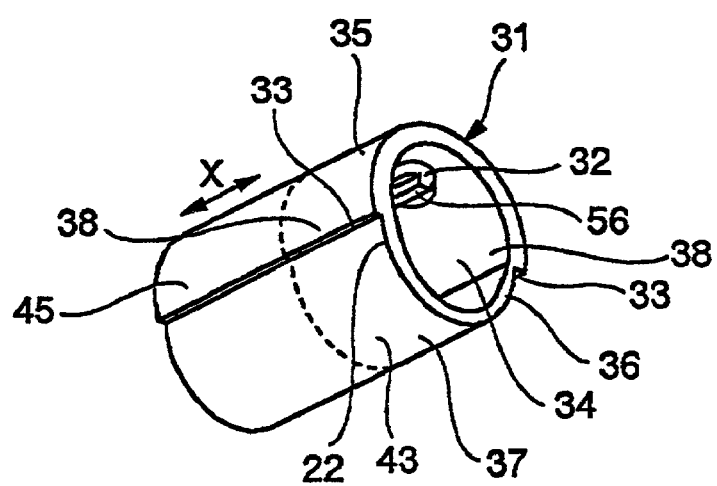
FIG. 6 is a perspective view showing a sleeve member of FIG. 5 when viewed from slantwise below.
Figure 7:
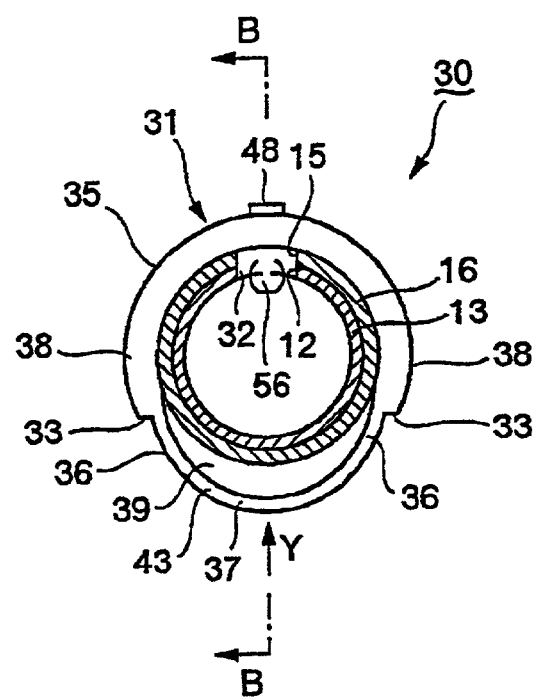
FIG. 7 is a cross sectional view, taken on line A—A of FIG. 8(*a*), for explaining a pipe connecting structure according to another embodiment of the present invention.

The engagement protrusion to be inserted into and engaged with the protrusion insertion hole is not necessarily integral with the inner surface of the sleeve body. For example, as shown in FIG. 4, it is also accepted that a circular protrusion element 40 made of stainless steel, which is formed as a separate member from the sleeve body 41, is inserted into the protrusion insertion holes 12, 15 of the pair of circular sleeve-like pipes 11, 14 which have been brought into coincident with each other at the connecting portion 21, and engaged therewith, and then the circular protrusion element 40 is pressed with a plastic sleeve body 41 having a cutout 42 which is attached in such a manner as to cover the connecting portion 21, thereby retaining the engagement state of the circular protrusion element 40.

It is not essentially required that the tapered surface 23 is provided to the distal end side of the guide rib 19. It is also accepted that only the peripheral edge portion of the distal end of the male side end portion 13 is provided with a tapered surface, or none of the distal end side of the guide rib 19 nor the distal end edge portion of the male side end portion 13 is provided with a tapered surface. In the alternative, only the distal end side of the guide rib 19 may be provided with a tapered surface.

FIGS. 5, 6, 7, 8(a) and 8(b) show a pipe connecting structure 30 according to another embodiment of the present invention. According to this embodiment, a sleeve member 31 comprises a sleeve body 35 extending on opposite sides of an engagement pin (engagement protrusion) 32 formed therebetween, along an outer peripheral surface of a female side end portion 16 and tightly contacting the outer peripheral surface of the female side end portion 16 at a region exceeding a semi-circle, with a gap 34 left between opposite ends 33, 33 in a circumferential direction, and a pressing body 43 including a pair of support leg portions 36, 36 and a pressing portion 37 supported at opposite sides thereof by the support leg portions 36, 36 and disposed in such a manner as to retain a space 39 (see FIGS. 7, 8(a) and 8(b)) between the pressing portion 37 and the outer peripheral surface of the female side end portion 16 by connecting distal end portions of the pair of support leg portions 36, 36 to opposite end portions 38, 38, with the gap 34 of the sleeve body 35 sandwiched therebetween at a location confronting the engagement pin 32.

The pressing portion 37 is pressed in a Y-direction towards the outer peripheral surface of the female side end portion 16 to push out the sleeve body 35 upward at the engagement pin 32 side. By doing so, the engagement pin 32 is moved outward in a radial direction so that an engagement state of the engagement pin 32 with respect to a male side protrusion engagement hole 12 can be released (see FIG. 8(b)).

Figure 8A:
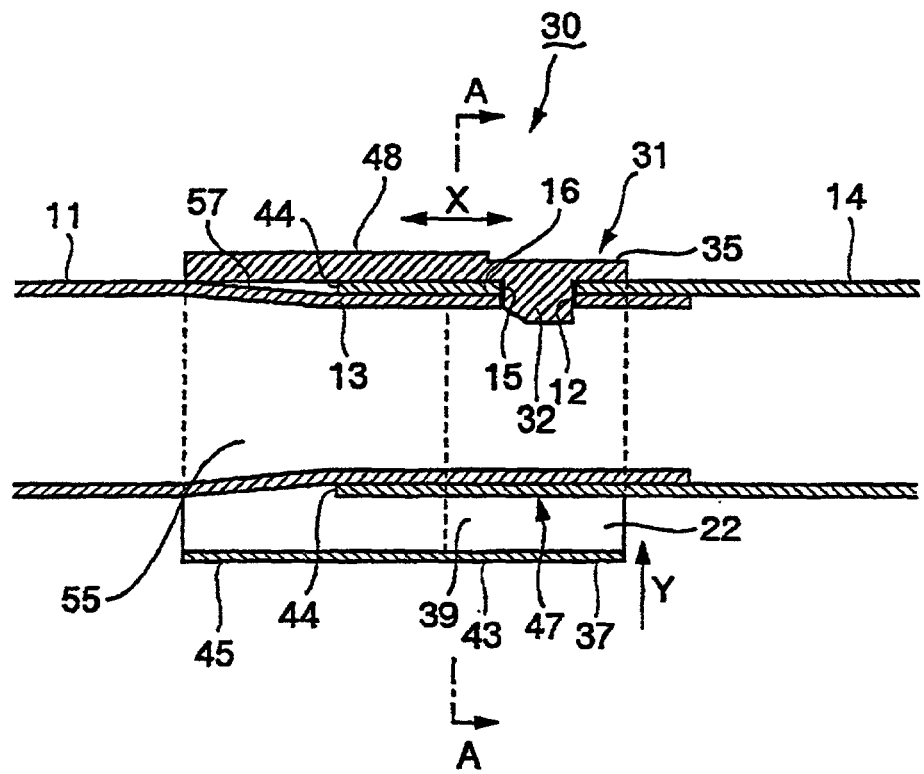
FIG. 8(*a*) is a longitudinal sectional view, taken on line B—B of FIG. 7, for explaining a state in which a pair of sleeve-like pipes are integrally connected together and FIG. 8(*b*) is a longitudinal sectional view, taken on line B—B of FIG. 7, for explaining a state for exploding a pair of sleeve-like pipes.
Figure 8B:
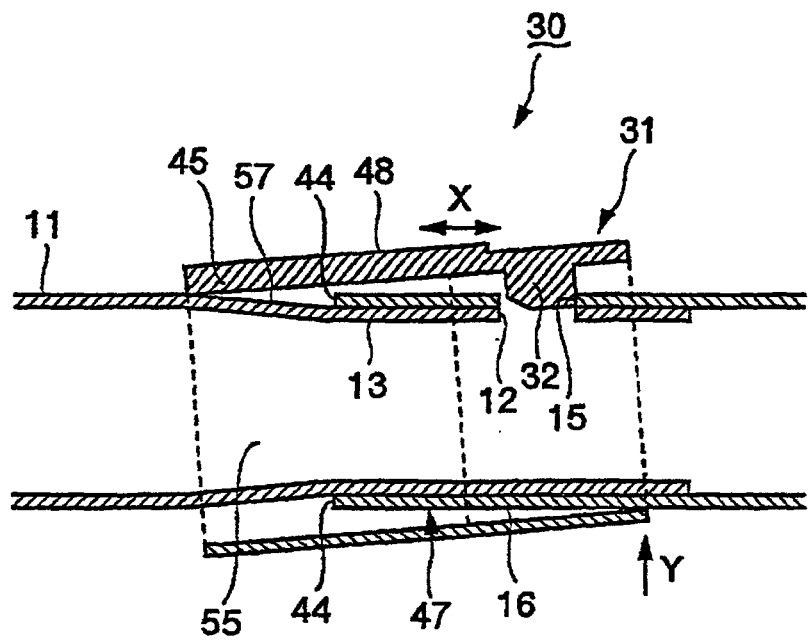

Moreover, according to this embodiment, the sleeve member 31 integrally includes an auxiliary sleeve 45 which is connected to the sleeve member 31 in an axial direction X and adapted to cover a seam portion 44 (see FIGS. 8(a) and 8(b)) where the male side end portion 13 and the female side end portion 16 are overlapped with each other.

The sleeve member 31 is, for example, a resiliently deformable annular member made of synthetic resin (plastics). The sleeve member 31 has a configuration formed by integrally connecting the sleeve body 35 as a circular portion and the pressing body 43 as a circular portion having curvature smaller than that of the sleeve body 35. An inside diameter of a circular section of the sleeve body 35 is coincident with an outside diameter of the female side end portion 16. The sleeve body 35 extends in a circumferential direction on opposite sides of a place from where the engagement pin 32 projects. That is to say, the sleeve body 35 is arranged, in a tightly contacted manner, along the outer peripheral surface of the female side end portion 16 in a region exceeding an arc length which is equal to a semi-circle length plus at least a projection length of the engagement pin 32. Between the opposite ends 33, 33 of the sleeve body 35, an angle region of 180 degrees, preferably between 100 to 140 degrees, is cut out in the circumferential direction such that the gap 34 is left remained.

Owing to the above-mentioned arrangement, the sleeve body 35 is resiliently deformed at the time of being pushed out at the engagement pin 32 side upon pressing of the pressing body 43. By doing so, the sleeve body 35 is slidingly moved in such a manner as to ride along the outer peripheral surface of the female side end portion 16 while spreading the gap 34 so that a central portion where the engagement pin 32 projects can be moved outward in a radial direction until the engagement state of the engagement pin 32 with a male side protrusion engagement hole 12 is released, without making the opposite end portions 33, 33 fall off the outer peripheral surface of the female side end portion 16. When the pressure on the pressing body 43 is released, the sleeve body 35 is restored to its original shape by biasing force, for returning the enlarged gap 34 to its original state and smoothly restoring it to a state, whereas a distal end portion of the engagement pin 32 projects from an inner peripheral surface of the female side end portion 16 (FIG. 8(a)).

The pressing body 43 has such a structure that the pressing portion 37 located in the circular cross-sectional center of the pressing body 43 is supported by the opposite support leg portions 36, 36. This makes it possible to form a space 39, which retains an interval exceeding at least a projection length of the engagement pin 32 from an inner peripheral surface of the female side end portion 16, between an inner side of the pressing body 37 and the outer peripheral surface of the female side end portion 16 to which the sleeve member 31 is attached. Upon pressing of the pressing body 43, this pressing force is transmitted to the opposite end portions 33, 33 of the sleeve body 35 through the support leg portions 36, 36 which are integrally connected to sleeve body 35, so that the sleeve body 35 can be pushed out at the engagement pin 32 side. When the pressing portion 37 is pressed until it is brought into intimate contact with the outer peripheral surface of the female side end portion 16, the distal end portion of the engagement pin 32 is withdrawn from the male side protrusion engagement hole 12 (FIG. 8(b)). This makes it possible to disassemble the pair of circular sleeve-like pipes 11, 14 by withdrawing the male side end portion 13 from the female side end portion 16.

The auxiliary sleeve 45 integrally joined with the sleeve member 31 has the same cross-sectional configuration as that of the sleeve member 31. The auxiliary sleeve 45 is integrally connected to that end face of the sleeve body 35 on the circular sleeve-like pipe 35 side (the connected portion is shown by a broken line). The auxiliary sleeve 45 is arranged in such a manner as to cover the overlapping seam portion 44 forming a stage portion when the male side end portion 13 is inserted into the female side end portion 16 to form the connecting portion 47. By doing so, the connecting portion 47 can have a more attractive outer appearance. The auxiliary sleeve 45 is provided, on that area of its outer peripheral surface with a guide belt 48 disposed on an extension of the engagement pin 32 in the axial direction X. By virtue of this arrangement, the male side end portion 13 can smoothly be inserted into the female side end portion 16 while correctly positioning the protrusion guide groove 49 of the male side end portion 13 with respect to the guide belt 48.

According to the connecting structure 30 of this embodiment, the pair of circular sleeve-like pipes 11, 14 can easily be connected integrally in the axial direction X by the following simple operation. The male side end portion 13 is inserted, through the distal end opening 55, into the female side end portion 16 to which the sleeve member 31 and the auxiliary sleeve member 45 integral with the sleeve member 31 are attached and with the distal end portion of the engagement pin 32 projecting inward from the inner peripheral surface through the female side engagement hole 15, while correctly positioning them by means of the protrusion guide groove 49 and the guide belt 48. After the distal end portion of the male side end portion 13 is brought into abutment with the engagement pin 32 projecting inward as a result of insertion of the male side end portion 13 into the female side end portion 16, a guide rib 56 of the engagement pin 32 rides along the protrusion guide groove 49 while enlarging the diameter of the sleeve member 31 and the engagement pin 32 slidingly moves along the protrusion guide groove 49. When the male side end portion 13 is inserted into the female side end portion 16 until a steep gradient portion 57 of the male side end portion 13 is brought into abutment with an edge portion of the distal end opening 55 and the connecting portion 47 is formed, the male side engagement hoe 12 and the female side engagement hole 15 are aligned with each other and the engagement pin 32 is pushed down by resilient biasing force of the sleeve member 31 which is enlarged in diameter, so that the engagement pin 32 is lockingly engaged with the male side engagement hole 12. By this, the pair of circular sleeve-like pipes 11, 14 are firmly and easily connected integrally in the axial direction X (see FIG. 8(a)).

Moreover, according to the connecting structure 30 of this embodiment, the integrally connected circular sleeve-like pipes 11, 14 can easily be disassembled by the following simple operation. When the pressing portion 37 of the sleeve member 30 attached in such a manner as to cover the connecting portion 47 is pressed towards the engagement pin 32 side until it is intimately contacted with the outer peripheral surface of the female side end portion 16, the central portion where the engagement pin 32 projects is moved outward in the radial direction and as a result, the engagement state of the engagement pin 32 with respect to the male side protrusion engagement hole 12 is released. Therefore, the pair of circular sleeve-like pipes 11, 12 can easily be disassembled by smoothly withdrawing the male side end portion 13 from the female side end portion 16. Moreover, since the distal end portion of the engagement pin 32 can positively be withdrawn from the male side protrusion engagement hole 12 by pressing the pressing portion 37 until it is intimately contacted with the outer peripheral surface of the female side end portion 16, it can effectively be prevented that the male side end portion 13 is erroneously withdrawn before the engagement pin 32 is withdrawn from the male side protrusion engagement hole 12.

Thus, according to this embodiment, the integrally connected pair of sleeve-like pipes 11, 14 can smoothly be disassembled by easily releasing the engagement state of the engagement pin 32 with respect to the coincided engagement holes 12, 15. Moreover, the engagement pin 32 can effectively be prevented from being broken. It is not essentially required that the auxiliary sleeve 45 is integrally joined with the sleeve member 31.

Figure 9:
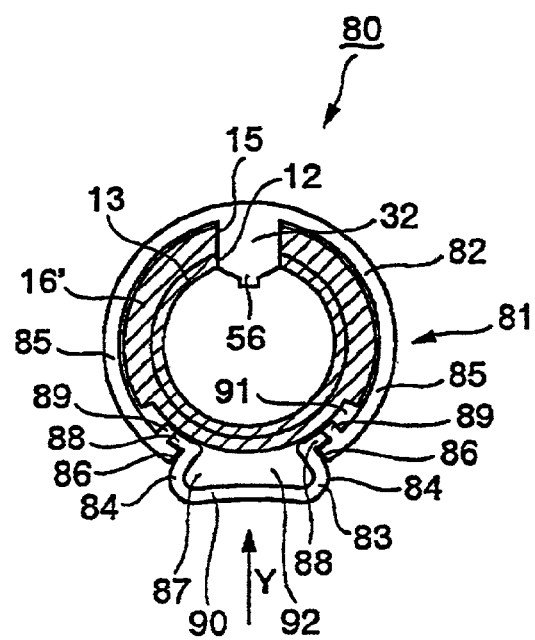
FIG. 9 is a cross sectional view for explaining a pipe connecting structure according to a further embodiment of the present invention.

FIG. 9 shows a pipe connecting structure 80 according to a further embodiment of the present invention. The connecting structure 80 shown in FIG. 9 has generally the same construction as the above-mentioned pipe connecting structure 30. On the other hand, a sleeve body 82 and a pressing body 83, which constitute the sleeve member 81, are separate members. Distal end portions of support leg portions 84, 84 of the pressing body 83 are in abutment with opposite end portions 85, 85 of the sleeve body 32 such that a gap 87 formed between the end portions 86, 86 of the sleeve body 82 can be enlarged.

Specifically, the distal end portions of the support leg portions 84, 84 of the pressing body 83 are bent outward like a letter L and those bent portions 88, 88 are lockingly inserted into gaps formed between the inner peripheral surfaces of the opposite end portions 85, 85 of the sleeve body 82 and the outer peripheral surface of a female side end portion 16'. Moreover, their distal ends are abutted with pressing protrusions 89, 89 protruding inward from the inner peripheral surfaces of the opposite end portions 85, 85 and caused to push the pressing protrusions 89, 89 outward along the outer peripheral surface of the female side end portion 16' by pressing force from the pressing portion 90 so that the gap 87 between the opposite ends 86, 86 of the sleeve body 82 is enlarged. A circular cutout groove 91 is formed in that area of the outer peripheral surface located on the opposite side of the female side protrusion engagement hole 15 of the female side end portion 16' and the pressing protrusions 89, 89 are slidingly movably arranged along this cutout groove 91. It should be noted that the mode for connecting the support leg portions 84, 84 of the pressing body 83 to the opposite end portions 85, 85 of the sleeve body 82 includes not only the integral connection but also the abutment connection of the type as just mentioned.

Also by the pipe connecting structure 80 of this embodiment, when the pressing portion 90 with a space 92 retained its inside is pressed towards the engagement pin 32 side until it is brought into intimate contact with the outer peripheral surface of the female side end portion 16', the engagement state of the engagement pin 32 with respect to the male side protrusion engagement hole 12 is released to exhibit the generally same effect as the above embodiments.

Figure 10A:
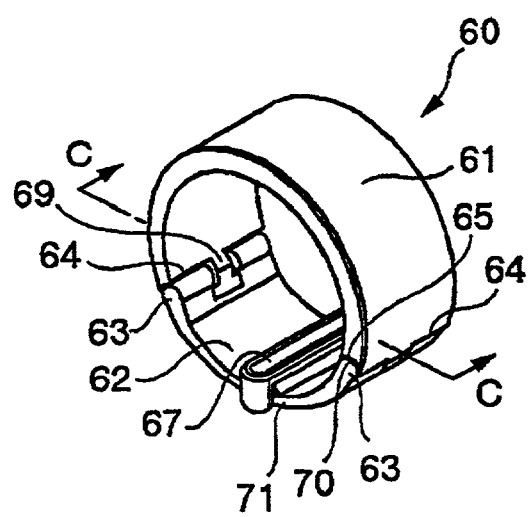
FIG. 10(*a*) is a perspective view showing another mode of a sleeve member used in a pipe connecting structure of the present invention and FIG. 10(*b*) is a sectional view taken on line C—C of FIG. 10(*a*)
Figure 10B:
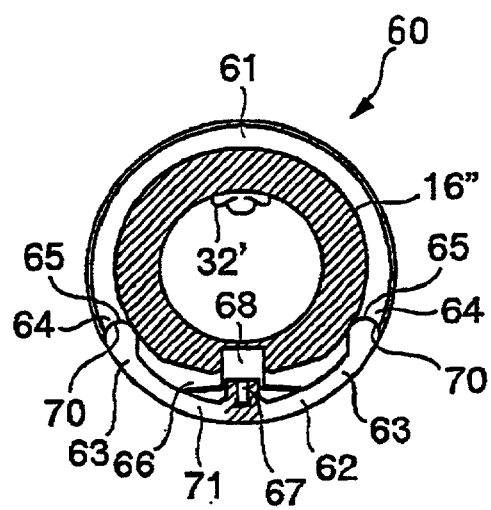

FIGS. 10(a) and 10(b) show another form of the sleeve member used in the pipe connecting structure of the present invention. According to the sleeve member 60 of FIGS. 10(a) and 10(b), support portions 63, 63 of a pressing body 62 are connected to opposite end edges 64, 64 of a sleeve body 61 through a pin joint portion 69, with projecting curved surfaces 70, 70 of distal end faces abutted with depressing curved surfaces 65, 65 of the opposite end edge portions 64, 64. The pressing body 62 has a circular section of a smaller curvature than an outer peripheral surface of a female side end portion 16". The pressing body 62 is supported by the opposite support portions 63, 63 connected to the opposite end edge portions 64, 64 of the sleeve body 61, thereby retaining a space 66 between a central pressing portion 71 and the outer peripheral surface of the female side end portion 16". At the center of the inside of the pressing portion 71, a guide ridge 67 projecting inward extends in an axial direction of the sleeve member 60. A guide groove 68 for allowing the guide ridge 67 to be engaged therein when the pressing portion 71 is pressed is formed in that area of the outer peripheral surface of the female side end portion 16" located on the opposite side of the female side protrusion engagement hole.

Also by using this sleeve member 60, when the pressing portion 71 is pressed toward the space 66 and is brought into intimate contact with the outer peripheral surface of the female side end portion 16", the engagement state of the engagement pin 32' with respect to the male side engagement hole is easily released. Moreover, since a correct positioning is established by locking insertion of the guide ridge 67 into the guide groove 68 when the pressing portion 71 is pressed, the disassembling operation can be performed in a more stable manner.

FIG. 11 shows still another mode of the sleeve member used in the pipe connecting structure of the present invention. In a sleeve member 93 shown in FIG. 11, a sleeve body 94 is constituted by nearly a half area of the sleeve member 93 on the side of an engagement pin 17" being projected from the inner peripheral surface. A gap 96 is formed between opposite ends 95, 95 in a circumferential direction of the sleeve boy 94. At a location confronting the engagement pin 17", a pressing body 97 projecting to the outside of the sleeve member 93 is formed. The pressing body 97 includes support leg portions 98, 98 which are integrally connected to the opposite ends 95, 95 of the sleeve body 94. At a location crossing the center of the pressing body 97, a slit 79 is formed over the entire length of a sleeve member 93 so as to enlarge the sleeve member 93 in diameter by widening the slit 79. The sleeve member 93 also retains the space between a pressing portion 99 of the pressing body 97 and the outer peripheral surface of the female side end portion, which makes it possible, by pressing the pressing member 99, to exhibit an advantageous effect substantially the same as that of the aforementioned embodiments.

The present invention can be changed in various ways without being limited to the above embodiments. For example, it is not limited to a connecting structure of a handle of a cleaning tool, the present invention is also employed to a circular sleeve-like pipe connecting structure of various elongated rod-like members which are formed by connecting a plurality of circular sleeve-like pipes integrally in an axial direction, such as a handle of a stick.

The present invention includes the pipe connecting structures and the cleaning tool according to the under-mentioned embodiments ① to ⑦.

① A pipe connecting structure for connecting a pair of sleeve-like pipes integrally in an axial direction by inserting a male side end portion of one of the pair of sleeve-like pipes into an opening of a female side end portion of the other sleeve-like pipe so as to serve as a connecting portion, wherein a male side protrusion insertion hole and a female side protrusion insertion hole are formed in a peripheral surface of each end portion of a pair of the sleeve-like pipes which constitute the connecting portion, the protrusion insertion holes are brought into coincident with each other, an engagement protrusion is inserted in the protrusion insertion holes and engaged therewith, and such an engagement state of the engagement protrusion is retained by engagement retainer means.

② A pipe connecting structure according to the item ①, wherein the engagement retainer means comprises a sleeve portion disposed in such a manner as to cover the connecting member and the sleeve member includes a resilient portion capable of being deformed radially outwardly so as to generate a biasing force radially inwardly, and wherein an engagement protrusion formed on the sleeve member is inserted into the protrusion insertion holes from the outside of the connecting portion and engaged therein and pressed with the resilient portion so as to retain such a engaging state of the engagement protrusion.

③ A pipe connecting structure according to the item ①, wherein a guide rib is formed on the engagement protrusion and a guide groove is formed in an outer peripheral surface of the male side end portion in such a manner as to extend from a distal end edge portion to the male side protrusion insertion hole, wherein the engagement protrusion is inserted in the female side protrusion insertion hole and engaged therein, the guide rib protruding from an inner peripheral surface of the female side end portion is engaged with the guide groove, and the guide rib is slidingly moved along the guide groove so that the engagement protrusion is guided to the male side protrusion insertion hole so as to be inserted in the hole and engaged therewith.

④ A pipe connecting structure according to the item ②, wherein a guide rib is formed on the engagement protrusion and a guide groove is formed in an outer peripheral surface of the male side end portion in such a manner as to extend from a distal end edge portion to the male side protrusion insertion hole, wherein the engagement protrusion is inserted in the female side protrusion insertion hole and engaged therein, the guide rib protruding from an inner peripheral surface of the female side end portion is engaged with the guide groove, and the guide rib is slidingly moved along the guide groove so that the engagement protrusion is guided to the male side protrusion insertion hole so as to be inserted in the hole and engaged therewith.

⑤ A pipe connecting structure according to the item ② or ④, wherein the sleeve member comprises a circular sleeve-like sleeve body having an inside diameter enough to cover a periphery of the connecting portion in a tightly contacted manner and the engagement protrusion integral with the sleeve body and protruding from an inner surface of the sleeve body, and wherein a notch is formed in a peripheral surface of the sleeve body over an entire length in an axial direction of the sleeve body and the sleeve body is entirely deformed radially outwardly so as to serve as the resilient portion for generating a biasing force radially inwardly.

⑥ A pipe connecting structure according to the item ② or ④, wherein the sleeve member comprises a sleeve body extending each side of the engagement protrusion along an outer peripheral surface of the female side end portion and arranged on the outer peripheral surface of the female side end portion in a tightly contacted manner in a region exceeding a semi-circle with a gap left between opposite ends in a circumferential direction and a pressing body composed of a pressing portion supported from both sides by a support portion and disposed in such a manner as to retain a space between the pressing portion and the outer peripheral surface of the female side end portion by allowing distal end portions of the pair of support portions connected to opposite end portions of the sleeve body at a location opposite the engagement protrusion, and wherein the pressing portion is pressed to push out the sleeve body towards the engagement protrusion side so that the engagement state of the engagement protrusion with the male side engagement hole is released.

⑦ A cleaning tool including a handle constituted by connecting a plurality of sleeve-like pipes integrally in an axial direction through the pipe connecting structure according to one of the items ① to ⑥.

INDUSTRIAL APPLICABILITY

According to a pipe connecting structure and a cleaning tool using the pipe connecting structure of the present invention, the connecting portion can effectively be prevented from being loosened and broken even if a large bending stress is applied to thereto and a pipe connecting structure capable of easily connecting a pair of sleeve-like pipes integrally in an axial direction with a simple structure can easily be constituted.

Moreover, according to a pipe connecting structure and a cleaning tool using the pipe connecting structure of the present invention, a pair of sleeve-like pipes can easily be connected integrally in an axial direction by means of simple operation and the connecting operation can smoothly be performed even in a dark place.

Furthermore, according to a pipe connecting structure and a cleaning tool using the pipe connecting structure of the present invention, the integrally connected pair of sleeve-like pipes can smoothly be disassembled by easily releasing the engagement state of the engagement protrusion with respect to the coincided engagement holes, and the engagement protrusion can effectively be prevented from being broken.

What is claimed is:

1. A pipe connecting structure for integrally connecting a pair of pipes, comprising:
    a male side end portion of a first pipe, said male side end portion having an insertion hole on a peripheral surface thereof, said first pipe having a first portion, a second portion, and a third portion, said first portion of said first pipe including said male side end portion;
    a female side end portion of a second pipe, said female side end portion having an insertion hole on a peripheral surface thereof, wherein said male and female side end portions are sized and shaped such that said male side end portion can be inserted into said female side end portion until said insertion hole of said male side end portion aligns with said insertion hole of said female side end portion;
    an engagement retainer including an engagement protrusion, wherein said engagement retainer is positionable relative to said male side end portion inserted into said female side end portion such that said engagement protrusion can be inserted into said aligned insertion holes to retain the insertion of said male side end portion into said female side end portion; and
    a first guide part extending on said male side end portion from a distal end of said male side end portion to said insertion hole of said male side end portion,
    wherein said engagement retainer further comprises a second guide part which is mateable with said first guide part, said second guide part being located at a portion of said engagement protrusion which can extend through said insertion hole of said female side end portion to mate with said first guide part to guide said engagement protrusion towards said insertion hole of said male side end portion,
    wherein said engagement retainer comprises a sleeve adapted to cover said female side end portion, wherein said engagement protrusion extends radially inwardly from said sleeve,
    wherein said sleeve includes a resilient portion configured to bias said engagement protrusion farther into said aligned insertion holes when said engagement protrusion is inserted into said aligned insertion holes,
    wherein said first portion of said male side end portion of said first pipe has an outside diameter less than an inside diameter of said female side end portion, said third portion of said first pipe has an outside diameter approximately equal to an outside diameter of said female side end portion, said outside diameter of said third portion of said first pipe is reduced with a steep gradient portion to an outside diameter of said second portion of said first pipe, said outside diameter of said second portion is reduced with a gentle gradient portion to said outside diameter of said first portion of said first pipe, a base end of said steep gradient portion of said first pipe is configured to abut an opening edge portion of said female side end portion to form a seam portion when said engagement protrusion is inserted into said aligned insertion holes, and
    wherein said sleeve is integrally joined with an auxiliary sleeve which is connected in an axial direction and adapted to cover said seam portion.

2. The pipe connecting structure according to claim 1, wherein said first guide part is a groove and said second guide part is a rib.

3. The pipe connecting structure according to claim 1, wherein said sleeve includes an axial cutout along its entire length so that the sleeve as a whole can deform so as to bias said engagement protrusion farther into said aligned insertion holes when said engagement protrusion is inserted into said aligned insertion holes.

4. The pipe connecting structure according to claim 1, wherein said engagement protrusion is integral with said sleeve.

5. The pipe connecting according to claim 1, wherein said engagement protrusion is formed as a separate part from said sleeve.

6. The pipe connecting structure according to claim 1, wherein the first guide part includes a tapered portion toward the distal end of said male side end portion.

7. The pipe connecting structure according to claim 1, wherein said second guide part has a tapered surface toward a distal end of said female side end portion.

8. The pipe connecting structure according to claim 1, wherein said female side end portion is enlarged in diameter towards a distal end of said female side end portion with a gentle gradient portion coincident with said gentle gradient portion of said first pipe.

9. A cleaning tool comprising a cleaning element and a handle attached to said cleaning element, wherein said handle comprises a first pipe and a second pipe, further comprising a pipe connecting structure for integrally connecting said first and second pipes, comprising:
    a male side end portion of said first pipe, said male side end portion having an insertion hole on a peripheral surface thereof, said first pipe having a first portion, a second portion, and a third portion, said first portion of said first pipe including said male side end portion;
    a female side end portion of said second pipe, said female side end portion having an insertion hole on a peripheral surface thereof, wherein said male and female side end portions are sized and shaped such that said male side end portion can be inserted into said female side end portion until said insertion hole of said male side end portion aligns with said insertion hole of said female side end portion;

an engagement retainer including an engagement protrusion, wherein said engagement retainer is positionable relative to said male side end portion inserted into said female side end portion such that said engagement protrusion can be inserted into said aligned insertion holes to retain the insertion of said male side end portion into said female side end portion; and a first guide part extending on said male side end portion from a distal end of said male side end portion to said insertion hole of said male side end portion, wherein said engagement retainer further comprises a second guide part which is mateable with said first guide part, said second guide part being located at a portion of said engagement protrusion which can extend through said insertion hole of said female side end portion to mate with said first guide part to guide said engagement protrusion towards said insertion hole of said male side end portion, wherein said engagement retainer comprises a sleeve adapted to cover said female side end portion, wherein said engagement protrusion extends radially inwardly from said sleeve, wherein said sleeve includes a resilient portion configured to bias said engagement protrusion farther into said aligned insertion holes when said engagement protrusion is inserted into said aligned insertion holes, wherein said first portion of said male side end portion of said first pipe has an outside diameter less than an inside diameter of said female side end portion, said third portion of said first pipe has an outside diameter approximately equal to an outside diameter of said female side end portion, said outside diameter of said third portion of said first pipe is reduced with a steep gradient portion to an outside diameter of said second portion of said first pipe, said outside diameter of said second portion is reduced with a gentle gradient portion to said outside diameter of said first portion of said first pipe, a base end of said steep gradient portion of said first pipe is configured to abut an opening edge portion of said female side end portion to form a seam portion when said engagement protrusion is inserted into said aligned insertion holes, and wherein said sleeve is integrally joined with an auxiliary sleeve which is connected in an axial direction and adapted to cover said seam portion.

10. The cleaning tool according to claim 9, wherein said first guide part is a groove and said second guide part is a rib.

11. The cleaning tool according to claim 9, wherein said sleeve includes an axial cutout along its entire length so that the sleeve as a whole can deform so as to bias said engagement protrusion farther into said aligned insertion holes when said engagement protrusion is inserted into said aligned insertion holes.

12. The cleaning tool according to claim 9, wherein said engagement protrusion is integral with said sleeve.

13. The cleaning tool according to claim 9, wherein said engagement protrusion is formed as a separate part from said sleeve.

14. The cleaning tool according to claim 9, wherein the first guide part includes a tapered portion toward the distal end of said male side end portion.

15. The cleaning tool according to claim 9, wherein said second guide part has a tapered surface toward a distal end of said female side end portion.

16. The cleaning tool according to claim 9, wherein said female side end portion is enlarged in diameter towards a distal end of said female side end portion with a gentle gradient portion coincident with said gentle gradient portion of said first pipe.

17. A pipe connecting structure, comprising:

a first pipe having a first portion including a first insertion hole and a first guide part, a second potion, and a third portion;

a second pipe having a first portion including a second insertion hole configured to be aligned with the first insertion hole; and an engagement retainer including an engagement protrusion configured to be inserted into the first insertion hole and the second insertion hole when the first and second insertion holes are aligned, wherein:

the first guide part extends from a distal end of the first portion of said first pipe to the first insertion hole, and the distal end of the first portion of said first pipe, including the first guide part, has a first surface tapered toward the distal end, wherein said engagement retainer comprises a sleeve adapted to cover said first portion of said second pipe, wherein said engagement protrusion extends radially inwardly from said sleeve, wherein said sleeve includes a resilient portion configured to bias said engagement protrusion farther into said aligned insertion holes when said engagement protrusion is inserted into said aligned insertion holes, wherein said first portion of said first pipe has an outside diameter less than an inside diameter of said first portion of said second pipe, said third portion of said first pipe has an outside diameter approximately equal to an outside diameter of said first portion of said second pipe, said outside diameter of said third portion of said first pipe is reduced with a steep gradient portion to an outside diameter of said second portion of said first pipe, said outside diameter of said second portion of said first pipe is reduced with a gentle gradient portion to said outside diameter of said first portion of said first pipe, a base end of said steep gradient portion of said first pipe is configured to abut an opening edge portion of said first portion of said second pipe to form a seam portion when said engagement protrusion is inserted into said aligned insertion holes, and wherein said sleeve is integrally joined with an auxiliary sleeve which is connected in an axial direction and adapted to cover said seam portion.

18. The pipe connecting structure according to claim 17, wherein said female side end portion is enlarged in diameter towards a distal end of said female side end portion with a gentle gradient portion coincident with said gentle gradient portion of said first pipe.

* * * * *